United States Patent [19]

Varasi et al.

[11] Patent Number: 5,000,774
[45] Date of Patent: Mar. 19, 1991

[54] METHOD OF MASKED TWO STAGE LITHIUM NIOBATE PROTON EXCHANGE

[75] Inventors: Mauro Varasi; Carlo Misiano; Antonello Vannucci, all of Rome, Italy

[73] Assignee: Selenia Industrie Elettroniche Associate S.p.A., Rome, Italy

[21] Appl. No.: 420,040

[22] Filed: Oct. 11, 1989

[51] Int. Cl.[5] ............................................. C03C 15/00
[52] U.S. Cl. .................................... 65/30.1; 65/30.13; 350/96.1
[58] Field of Search ............... 65/3.14, 30.1, 30.13; 350/96

[56] References Cited

U.S. PATENT DOCUMENTS

| | | | |
|---|---|---|---|
| 4,547,262 | 10/1985 | Spillman, Jr. et al. | 156/659.1 |
| 4,695,121 | 9/1987 | Mahapatra et al. | 350/96.12 |
| 4,705,346 | 11/1987 | Miyawaki | 350/96.12 |
| 4,725,774 | 2/1988 | Davis et al. | 350/96.11 |
| 4,755,014 | 7/1988 | Stoll et al. | 350/96.12 |
| 4,778,236 | 10/1988 | Miyawaki | 350/96.13 |
| 4,799,750 | 1/1989 | Miyawaki | 350/96.13 |

FOREIGN PATENT DOCUMENTS

| | | |
|---|---|---|
| 59-165008 | 9/1984 | Japan . |
| 60-79308 | 5/1985 | Japan . |
| 60-133406 | 7/1985 | Japan . |
| 60-144704 | 7/1985 | Japan . |
| 61-70535 | 4/1986 | Japan . |
| 61-188502 | 8/1986 | Japan . |
| 61-189507 | 8/1986 | Japan . |
| 61-189524 | 8/1986 | Japan . |
| 61-254938 | 11/1986 | Japan . |

*Primary Examiner*—David L. Lacey
*Assistant Examiner*—John J. Bruckner
*Attorney, Agent, or Firm*—Herbert Dubno

[57] ABSTRACT

Lithium niobate is $Li^+/H^+$ proton exchange in two stages. The first masked stage is a treatment with benzoic acid followed by a thermal treatment in oxygen at about 400° C. The thermal treatment is followed by masking a second coincident area and treating that area in a second $Li^+/H^+$ proton exchange with benzoic acid and lithium benzoate without altering the refractive index of the region outside the second area.

1 Claim, 2 Drawing Sheets

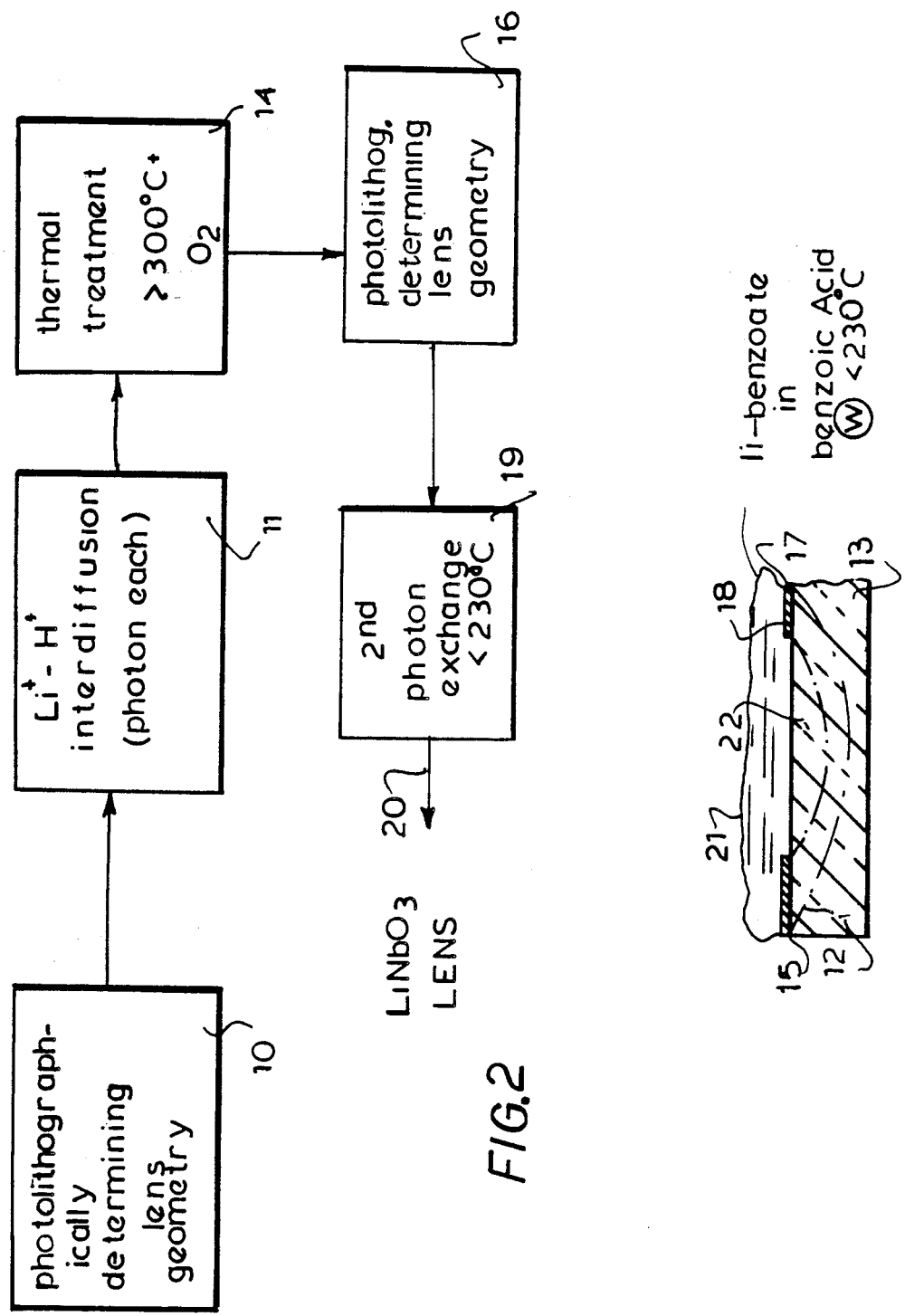

METHOD OF MASKED TWO STAGE LITHIUM NIOBATE PROTON EXCHANGE

FIELD OF THE INVENTION

Our present invention relates to a method of forming an optical component in an optical waveguide and, more particularly, to the formation of an optical component in a planar waveguide composed of $LiNbO_3$. The invention is, therefore, directed to the production of optical components, such as lenses, in a planar optical waveguide of the type used for integrated waveguide optics in the manufacture of devices in real-time optical processing of wide-band RF signals. In such substances lenses, other optical components and the waveguide itself form the basic element for integrated planar optical devices.

BACKGROUND OF THE INVENTION

It is known to provide optical devices of an integrated type, i.e. wherein lenses and other optical components are formed by compositional modifications of regions of an optical waveguide such as a cut or section of an $LiNbO_3$ crystal.

As for classic three-dimensional optical geometry, integrated optics utilizes means for implementing optical components which are related to the availability of materials or technologies which can vary the refractive index of the waveguide along the optical transmission path.

In one approach for the formation of integrated optical elements or components in a $LiNbO_3$ planar waveguide, a proton exchange ($Li^+/H^+$) is effected by contacting a selected region of the planar waveguide with molten (fused) benzoic acid at a temperature and for a period of time sufficient to allow the proton exchange to be carried out to the desired degree.

It has been found that the benzoic acid treatment, even when the melt is diluted with lithium benzoate, is not always satisfactory because the treated region does not have sufficient thermal stability, for example, to allow further modification as may be desired if, in a previously modified region having a refractive index different from that of the original waveguide, it is desired to form a more limited region with still further refractive index variations.

Because of the insufficient thermal stability of the first region, modifications which involve thermal treatments cannot be carried out effectively without damage to the original refractive index profiles which are detrimental to the integrated optical system.

OBJECT OF THE INVENTION

It is the principal object of this invention to provide an improved method of fabricating lenses and other optical components in planar waveguides obtained in a section of an $LiNbO_3$ waveguide substrate which allows alterations of the refractive index and hence of the guided modes using single and multimode proton exchange without the drawbacks outlined above.

A more specific object of this invention is to provide a method which permits several refractive index alterations at elevated temperatures of such a waveguide without deterioration because of thermal instability as outlined above.

Still another object of the invention is to provide an improved method of fabricating optical lenses and other components in a planar surface of an $LiNbO_3$ crystal which avoids disadvantages of earlier methods.

SUMMARY OF THE INVENTION

These objects are attained, in accordance with the present invention by a process which improves upon the prior art techniques by effecting, subsequent to the initial refractive index modification of a selected region of a planar surface of an $LiNbO_3$ cut, a thermal treatment at a temperature in excess of 300° C. in the presence of a flow of oxygen, and a second proton exchange with a diluted solution at a temperature less than 230° C. through a thin film aluminum template or mask.

The method of the invention, therefore, comprises the steps of:

(a) treating an exposed planar surface of an $LiNbO_3$ substrate with molten benzoic acid at a temperature and for a duration sufficient to effect a first $Li^+/H^+$ proton exchange with the substrate for selectively altering refractive index of a region of the substrate;

(b) thereafter thermally stabilizing the region by treating the region at a temperature in excess of 300° C. and in a flow of oxygen;

(c) masking portions of the region thermally stabilized in step (b) with an aluminum thin-film template while leaving an area of the region exposed through the thin-film template; and (d) treating the area in the region with molten benzoic acid at a temperature and for a duration sufficient to effect a second $Li^+/H^+$ proton exchange with the substrate for selectively altering the refractive index of the area without altering the refractive index of the portions of the region of the substrate.

The step of heating to a temperature of at least 300° C. stabilizes the $Li^+/H^+$ interdiffusion profile within the crystal.

This high temperature stabilization makes it possible to subject the crystal to subsequent lower temperature processes without causing an alteration of the waveguide refractive index profile in those regions where the lower temperature process is not being effected. Consequently, the second proton exchange may be performed solely by the overlay of a new exchange profile into the previous profile without altering the latter in the areas masked by the thin film of aluminum.

The thermal treatment may reduce the refractive index somewhat within the waveguide but has a uniform effect so that the insertion of protons during the second exchange can once again increase the refractive index in selected regions and also the mode index, thereby bringing about alterations required for optical component manufacturing.

BRIEF DESCRIPTION OF THE DRAWING

The above and other objects, features and advantages of my invention will become more readily apparent from the following description, reference being made to the accompanying highly diagrammatic drawing in which:

FIG. 2 is a flow diagram illustrating the processes of the invention; and

FIG. 3 is a diagrammatic section illustrating the second proton exchange step of the process.

SPECIFIC DESCRIPTION

Figure 1:
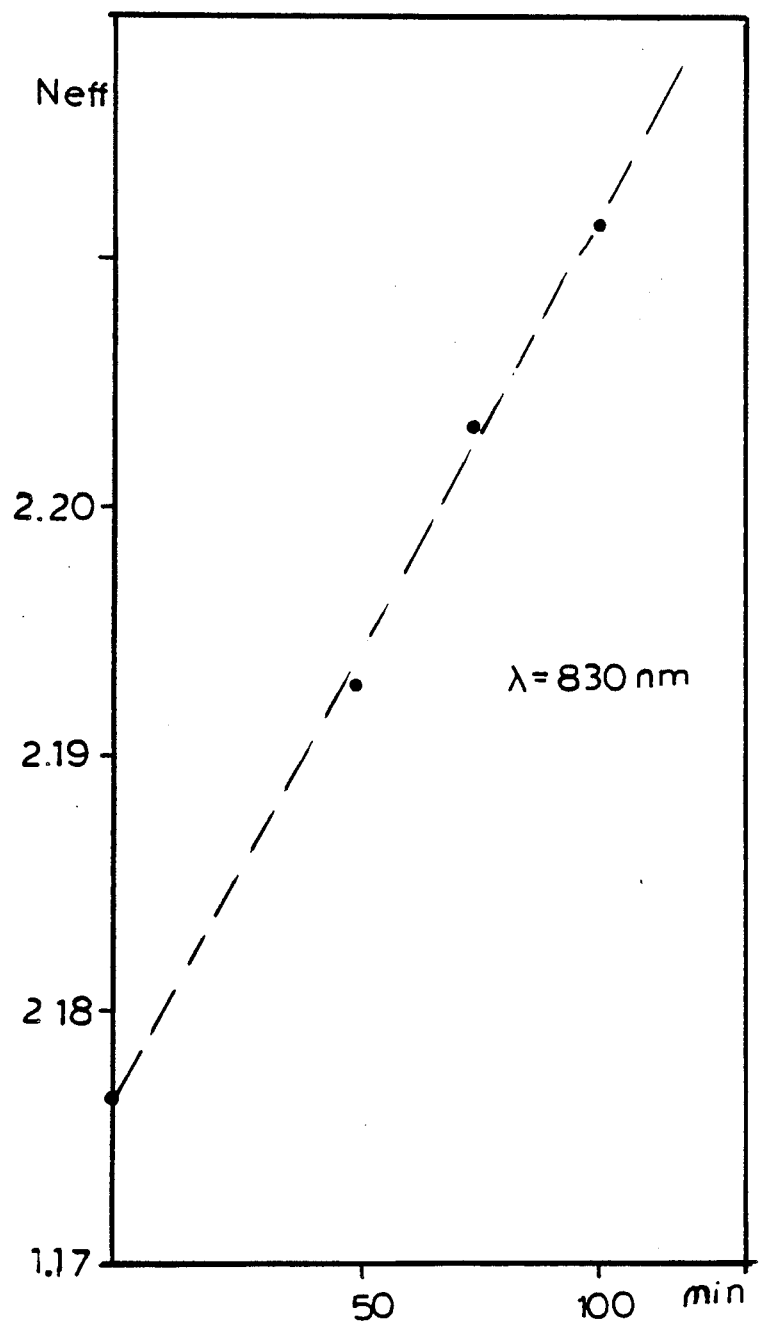
FIG. 1 is a graph of the effective refractive index plotted along the ordinate against time plotted along the abscissa showing the effective refractive index variation as a function of time and the duration of the second proton exchange in a single mode guide obtained by proton exchange followed by thermal treatment.

Referring first to FIG. 2, it can be seen that in a first stage 10, by photolithographic means, a given lens geometry is obtained, e.g. by forming a thin aluminum layer on the $LiNbO_3$ crystal and then photolithographically producing a window therein through which an initial proton exchange can occur. The initial proton exchange is shown at 11 and involves an $Li^+/H^+$ transfer with, for example, a benzoic acid melt which can contain lithium benzoate and is effected at a temperature which can be between 200° and 230° C. Referring to FIG. 3, the proton exchange zone may be represented by the region 12 in the crystal 13. However, the refractive index profile thus produced is not thermally stable and any attempt to effect a second proton exchange would alter the refractive index profile in an undesirable manner.

Accordingly, as can be seen at 14 in FIG. 2, the exposed surface 15 of the crystal and indeed the crystal removed from the melt and from which the original aluminum mask has been stripped, is subjected to a thermal stabilization treatment at a temperature in excess of 300° C. in the presence of an oxygen stream.

The result of a highly stable waveguide structure in which, although the refractive index may be slightly reduced, is thermally stable with respect to lower temperature processes. In stage 16, the waveguide can be photolithographically masked again to form the aluminum layer 17, through an opening 18 of which a second proton exchange is effected at a temperature below 230° C. in a benzoic acid and lithium benzoate melt as represented by the stage 19 in FIG. 2 to yield an $LiNbO_3$ crystal with a lens at 20.

The second proton exchange melt is shown at 21 in FIG. 3 and modifies the refractive index in the zone 22.

With the invention, therefore, guided modes with effective refractive index variations are obtained within optical waveguides by multiple proton exchange processes in $LiNbO_3$ crystals. The variations are used to produce lenses and other optical components in planar guides through aluminum thin film templates in which the planar geometry of the lenses is obtained by an etching process through a photolithographical polymer or photoresist.

SPECIFIC EXAMPLE

The first phase of the process, which is the subject of this invention, consists of a thermal treatment of the guide obtained by $H^+-Li^+$ proton exchange within the $LiNbO_3$ crystal. This treatment is carried out at 400° C. in presence of an oxygen flow an lasts for a time which is a function of the type of resulting waveguide required. In fact this thermal treatment has the effect of stimulating the $H^+$ and $Li^+$ interdiffusion, therefore modifying the guide refraction index profile, initially step-shaped, thereafter changing into a diffusion profile.

As a result of the thermal treatment, we obtain thermal stability of the guide which is sufficient to make it insensitive to the treatment of the second phase of the process.

The second phase consists of a second proton exchange with the following parameters:
composition of the melt:

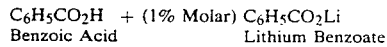
$C_6H_5CO_2H$ + (1% Molar) $C_6H_5CO_2Li$
Benzoic Acid          Lithium Benzoate temperature of the melt: 210° C. ± 2° C.

The exchange duration is variable and it depends upon the desired variation of the guided mode effective refraction index. FIG. 1 shows an example of the relationship between the second exchange duration and the resulting index variation. The graph refers to a single mode guide on Y cut obtained by means of a first proton exchange (210° C., 1% Lithium Benzoate in Benzoic Acid) for 30 minutes followed by thermal treatment at 400° C. in $O_2$ flow.

The main characteristics of the process are linearity between second exchange duration and index variation (within the variation interval useful for the manufacturing of interferential optical components), and additivity.

This characteristic makes it possible to obtain identical values for index variation by adding a number of separate second exchange phases keeping the sum of each phase times constant. This characteristic is most useful to obtain the required index variation as possible erroneous values may be corrected.

We claim:

1. A method of fabricating an optical component in an optical waveguide, comprising the steps of:
   (a) masking a planar surface of an $LiNbO_3$ substrate with aluminum to form an exposed planar surface, having the configuration of a lens, on said substrate and treating said exposed planar surface of said $LiNbO_3$ substrate with molten benzoic acid at a temperature, and for a duration, sufficient to effect a first $Li^+/H^+$ proton exchange within the portion of said substrate defined by the exposed planar surface in order to selectively alter refractive index of the region of said substrate defined by the exposed planar surface, said planar surface having the geometry of said lens;
   (b) thereafter thermally stabilizing said region by treating said region at a temperature of about 400° C. in a flow of oxygen;
   (c) masking a portion of said region thermally stabilized in step (b) photolithographically with an aluminum thin-film template while leaving a lens-shaped area of said region exposed through said thin-film template; and
   (d) treating said area in said region with molten benzoic containing about 1 mole percent dissolved lithium benzoate acid at a temperature of about 210° C. for a duration sufficient to effect a second $Li^+/H^+$ proton exchange with the area of the substrate defined by said template in order to selectively alter the refractive index of said area without altering the refractive index of said portion of said region of said substrate.

* * * * *